United States Patent [19]

Poot

[11] 4,236,738
[45] Dec. 2, 1980

[54] BALL JOINT FOR TWO PIPE ENDS

[75] Inventor: Martinus Poot, Vlaardingen, Netherlands

[73] Assignee: Machinefabriek Kreber B.V., Vlaardingen, Netherlands

[21] Appl. No.: 895,362

[22] Filed: Apr. 11, 1978

[30] Foreign Application Priority Data

Apr. 15, 1977 [NL] Netherlands .......................... 7704152

[51] Int. Cl.³ ............................................. F16L 27/04
[52] U.S. Cl. ............................ 285/263; 285/DIG. 25
[58] Field of Search ......... 285/263, 261, 167, DIG. 1, 285/DIG. 25, 106

[56] References Cited

U.S. PATENT DOCUMENTS

| 939,908 | 11/1909 | Greenlaw | 285/263 |
|---|---|---|---|
| 1,561,033 | 11/1925 | Spencer | 285/167 |
| 2,456,744 | 12/1948 | Sjoberg | 285/261 |
| 4,071,269 | 1/1978 | Halling | 285/263 |

FOREIGN PATENT DOCUMENTS

| 731306 | 5/1932 | France | 285/106 |
|---|---|---|---|
| 520715 | 5/1940 | United Kingdom | 285/263 |
| 1202527 | 8/1970 | United Kingdom | 285/DIG. 1 |

*Primary Examiner*—Dave W. Arola

[57] ABSTRACT

A joint for two pipe ends comprising a ring having a spherical outer surface to be mounted on one of the pipe ends, and a body having a complementary spherical inner surface to be mounted on the other pipe end, while for axially fixing the ring with respect to the body a retaining ring is present to engage the ring with a spherical inner surface, which retaining ring can be connected to the body, while sealing means are provided, wherein substantially concentrically in the assembly of the body and the ring a second, similar assembly of a second body connected to the respective pipe ends and a second ring having complementary spherical surfaces is provided, in which the sealing means are positioned.

4 Claims, 1 Drawing Figure

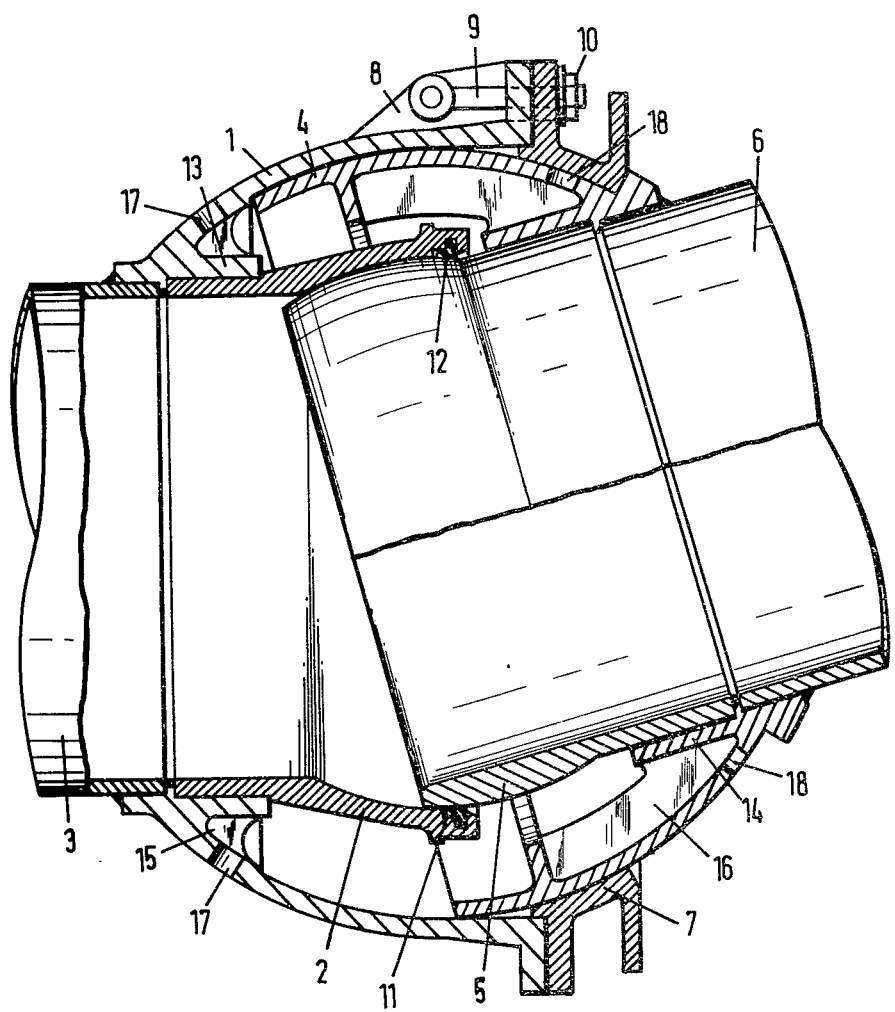

BALL JOINT FOR TWO PIPE ENDS

The present invention relates to a joint for two pipe ends, comprising a ring having a spherical outer surface to be mounted on one of the pipe ends, and a body having a complementary spherical inner surface to be mounted on the other pipe end, while for axially fixing the ring with respect to the body a retaining ring is present to engage the ring with a spherical inner surface, which retaining ring can be connected to the body, while sealing means are provided.

In such conventional joints the forces required to change the position of the ring with respect to the body during operation are particularly great.

The object of the invention is to remove this drawback.

Accordingly, the joint according to the invention is characterized in that substantially concentrically in the assembly of the body and the ring a second, similar assembly of a second body connected to the respective pipe ends and a second ring having complementary spherical surfaces is provided, in which the sealing means are positioned. In this way the pressure of fluid flowing through the joint is taken up by the second body and the second ring and the axial forces produced by the abutting pipe ends are taken up by the first body and the first ring, so that the adjusting forces mentioned above are considerably smaller than in the prior devices.

To prevent radial forces produced by the fluid from acting on the cooperating spherical surfaces of the first body and the first ring, the first body and the first ring can have a plurality of fluid passages.

The invention will now be elucidated by describing an embodiment of the joint with reference to the drawing showing a longitudinal section.

In the drawing a ball joint is provided with a first body 1 and a second body 2, which two bodies are connected to one another and to a pipe end 3 by welding, and with a first ring 4 and a second ring 5, connected to one another and to a pipe end 6 by welding. The two bodies 1 and 2 are provided with concentric, spherical inner surfaces, while the two rings 4 and 5 are provided with complementary, concentric, spherical outer surfaces.

In order to fix the bodies and rings axially with respect to one another, there is provided a retaining ring 7 engaging the first ring 4 with a spherical inner surface, which retaining ring is connected to body 1 by means of a plurality of bolts 9 and nuts 10 attached to lugs 8 extending from the first body 1. The bolts 9 and nuts 10 exert an axial force, to the left as seen in the drawings, which force pulls the spherical inner surface against the corresponding other surface of the body 4, then locking the ring 4 securely against the body 1 and forming an arc preventing the rings from disengaging from the corresponding body members 1 and 2.

To obtain a proper seal for flow of fluid between the pipes 3 and 6 a recess 11 is made in the second body 2, in which recess a sealing ring 12 is accommodated.

To obtain a sturdy construction the first body 1 and the first ring 4 include flanges 13 and 14 extending over the exterior of the second body 2 and the second ring 14, respectively. A plurality of stiffening ribs 15 and 16 are arranged between these flanges and the first body 1 and the first ring 4, respectively.

To prevent radial forces produced by fluid from acting on the co-operating spherical surfaces of the first body 1 and the first ring 4, the first body 1 includes a plurality of passages 17 and the first ring 4 includes a plurality of passages 18.

Finally it is of note that a great number of variants are possible without departing from the scope of the present invention.

I claim:

1. A joint for connecting the ends of a pair of pipes comprising a first assembly secured to the end of one said pipes comprising an inner ring member having an outer spherical surface, and an outer ring member extending axially over and spaced radially from first ring member and having an outer spherical surface, a second assembly secured to said other pipe comprising an inner annular body member having an inner spherical surface corresponding to the surface of said inner ring member and an outer annular body member extending axially over and radially spaced from said inner body member and having an inner spherical surface corresponding to the outer surface of said outer ring, said ring members and said body members being insertable within the other with the corresponding surfaces in slidable engagement and defining an annular chamber therebetween and seal means positioned between said inner ring member and said inner body member, apertures formed in at least one of said outer ring member and outer body member opening said annular chamber to atmosphere, and an annular clamp having a spherical inner surface corresponding to the surface of said outer ring member and means for securing of said clamp to said outer body member to wedge said outer ring member and outer body member against axial movement, and to cause the slidably engaging surfaces of said inner ring member and said inner body member to sealingly engage said seal means to form a sealed connection against the pressure of the fluid in said pipes.

2. The joint according to claim 1, wherein said means include said outer body member being provided with a radial flange, and bolt means for securing said clamp to it.

3. A joint according to claim 1, characterized in that the apertures are formed in the outer body member.

4. A joint according to claim 1 or 3, characterized in that the apertures are formed in the outer ring.

* * * * *